(12) United States Patent
Zhang et al.

(10) Patent No.: US 10,559,209 B2
(45) Date of Patent: Feb. 11, 2020

(54) VEHICLE POSITION PLANNING

(71) Applicant: SAP SE, Walldorf (DE)

(72) Inventors: Qiwei Zhang, Shanghai (CN); Junpeng Hu, Nanjing (CN); Ye Jin, Shanghai (CN)

(73) Assignee: SAP SE, Walldorf (DE)

( * ) Notice: Subject to any disclaimer, the term of this patent is extended or adjusted under 35 U.S.C. 154(b) by 110 days.

(21) Appl. No.: 15/348,942

(22) Filed: Nov. 10, 2016

(65) Prior Publication Data

US 2018/0130356 A1  May 10, 2018

(51) Int. Cl.
*G08G 1/00* (2006.01)
*G08G 1/01* (2006.01)
*G06Q 10/02* (2012.01)
*G06Q 10/06* (2012.01)

(52) U.S. Cl.
CPC ............ *G08G 1/202* (2013.01); *G06Q 10/02* (2013.01); *G06Q 10/063114* (2013.01); *G08G 1/0112* (2013.01); *G08G 1/0129* (2013.01); *G08G 1/0145* (2013.01)

(58) Field of Classification Search
None
See application file for complete search history.

(56) References Cited

U.S. PATENT DOCUMENTS 6,317,720 B1* 11/2001 Murakami ............ G06Q 10/02
705/13
9,135,815 B2  9/2015 Jin et al.
2012/0173136 A1* 7/2012 Ghoting ............ G01C 21/3453
701/411
2014/0011522 A1* 1/2014 Lin ....................... H04W 4/023
455/456.2
2015/0002319 A1  1/2015 Jin et al.
2015/0142518 A1* 5/2015 Farinha Gomes Felix ................
G06Q 30/0202
705/7.31
2016/0129787 A1* 5/2016 Netzer .................... H04W 4/44
701/36
2016/0209220 A1* 7/2016 Laetz .................... G06Q 10/02
2016/0247247 A1* 8/2016 Scicluna ............. G06F 17/3087
2016/0335576 A1* 11/2016 Peng ................. G06Q 10/06315
2017/0200374 A1* 7/2017 Yanagihara ............. G01S 19/42
2017/0219371 A1* 8/2017 Suzuki ............... G01C 21/3629

FOREIGN PATENT DOCUMENTS

CN     104166663 A  * 11/2014
CN     105679009 A  *  6/2016

OTHER PUBLICATIONS

Zhang Bo, Machine Translation of CN-105679009-A, Jun. 2016, espacenet.com (Year: 2016).*
Ye Weiliang, Machine Translation of CN-104166663-A, Nov. 2014, espacenet.com (Year: 2014).*

* cited by examiner

*Primary Examiner* — David P. Merlino
(74) *Attorney, Agent, or Firm* — Jones Day

(57) ABSTRACT

Described herein is a framework to facilitate vehicle position planning. In accordance with one aspect of the framework, transition information is determined based on the vehicle data, wherein the transition information includes pairs of starting and ending road segments and corresponding passenger states. Short-term demand for vehicles may be calculated based on the transition information and the historical transactional records. The short-term demand may then be used to generate a cruising recommendation.

20 Claims, 10 Drawing Sheets

| Name | Type | Comment |
|---|---|---|
| DEVID | VARCHAR | Identification for a car |
| LAT | DOUBLE | Latitude |
| LNG | DOUBLE | Longitude |
| GPS_TIME | SECONDDATE | The time when captured |
| HEADING | INTEGER | The angle between direction and the north |
| PASSENGER_STATE | INTEGER | 1 means with passenger, 0 means without passenger |

*Fig. 3a*

| | DEVID | LAT | LNG | GPS_TIME | HEADING | PASSENGER_STATE |
|---|---|---|---|---|---|---|
| 1 | 4335 | 32.022488 | 118.8704 | 2015-11-29 0:08:25.0 | 0 | 1 |
| 2 | 4335 | 32.022488 | 118.8704 | 2015-11-29 0:09:25.0 | 0 | 1 |
| 3 | 4335 | 32.022488 | 118.8704 | 2015-11-29 0:09:55.0 | 0 | 1 |
| 4 | 4335 | 32.022488 | 118.8704 | 2015-11-29 0:10:25.0 | 0 | 1 |
| 5 | 4335 | 32.022488 | 118.8704 | 2015-11-29 0:12:27.0 | 0 | 0 |
| 6 | 4335 | 32.022488 | 118.8704 | 2015-11-29 0:13:57.0 | 0 | 0 |
| 7 | 4335 | 32.022488 | 118.8704 | 2015-11-29 0:14:27.0 | 0 | 0 |
| 8 | 4335 | 32.022488 | 118.8704 | 2015-11-29 0:14:57.0 | 0 | 0 |
| 9 | 4335 | 32.022488 | 118.8704 | 2015-11-29 0:15:28.0 | 0 | 0 |
| 10 | 4335 | 32.022488 | 118.8704 | 2015-11-29 0:15:57.0 | 0 | 0 |
| 11 | 4335 | 32.022488 | 118.8704 | 2015-11-29 0:17:17.0 | 0 | 1 |
| 12 | 4335 | 32.022488 | 118.8704 | 2015-11-29 0:17:48.0 | 0 | 1 |
| 13 | 4335 | 32.022488 | 118.8704 | 2015-11-29 0:18:18.0 | 0 | 1 |
| 14 | 4335 | 32.022488 | 118.8704 | 2015-11-29 0:18:48.0 | 0 | 1 |
| 15 | 4335 | 32.022488 | 118.8704 | 2015-11-29 0:19:18.0 | 0 | 1 |
| 16 | 4335 | 32.022488 | 118.8704 | 2015-11-29 0:19:48.0 | 0 | 1 |
| 17 | 4335 | 32.022488 | 118.8704 | 2015-11-29 0:20:18.0 | 0 | 1 |
| 18 | 4335 | 32.022488 | 118.8704 | 2015-11-29 0:20:48.0 | 0 | 1 |
| 19 | 4335 | 32.022488 | 118.8704 | 2015-11-29 0:21:18.0 | 0 | 1 |
| 20 | 4335 | 32.022488 | 118.8704 | 2015-11-29 0:22:49.0 | 0 | 1 |
| 21 | 4335 | 32.022488 | 118.8704 | 2015-11-29 0:23:19.0 | 0 | 1 |

*Fig. 3b*

| Name | Type | Comment |
|---|---|---|
| DEVID | VARCHAR | Identification for a car |
| GPS_TIME | SECONDDATE | The time when captured |
| PASSENGER_STATE | INTEGER | 1 means with passenger, 0 means without passenger |
| TO_SEGMENT_ID | BIGINT | Foreign key to table segment |

*Fig. 6*

| Name | Type | Comment |
|---|---|---|
| DEVID | VARCHAR | Identification for a car |
| FROM_GPS_TIME | SECONDDATE | The time when captured |
| FROM_PASSENGER_STATE | INTEGER | 1 means with passenger, 0 means without passenger |
| FROM_SEGMENT_ID | BIGINT | Foreign key to table segment |
| TO_GPS_TIME | SECONDDATE | The time when captured |
| TO_PASSENGER_STATE | INTEGER | 1 means with passenger, 0 means without passenger |
| TO_SEGMENT_ID | BIGINT | Foreign key to table segment |

*Fig. 7*

| Plate Number | Time Slot | From Segment | To Segment |
|---|---|---|---|
| v0 | t1 | s1 | s2 |
| v1 | t1 | s2 | s3 |
| v2 | t1 | s2 | s4 |
| v3 | t1 | s2 | s5 |
| v4 | t1 | s2 | s4 |
| v5 | t1 | s2 | s4 |

FIG. 9B

| From Segment | To Segment | Transition Probability |
|---|---|---|
| s2 | s3 | 20% |
| s2 | s4 | 60% |
| s2 | s5 | 20% |

FIG. 9C

VEHICLE POSITION PLANNING

TECHNICAL FIELD

The present disclosure relates generally to computer systems, and more specifically, to a framework for planning vehicle positions.

BACKGROUND

In the internet era, Apps for booking taxis and other types of transportation have gained popularity in recent years. While such Apps may seem to lower the cost of operation, daily operation still faces many legal challenges and personal security risks in most countries. In addition, existing solutions do not necessarily yield the most efficient results. For example, the taxi that fulfills the service order is typically not the nearest available one, which translates to higher fuel consumption for the taxi's empty run to pick up the passenger.

SUMMARY

A framework for vehicle position planning is described herein. In accordance with one aspect of the framework, transition information is determined based on the vehicle data, wherein the transition information includes pairs of starting and ending road segments, and corresponding passenger states. Short-term demand for vehicles may be calculated based on the transition information and the historical transactional records. The short-term demand may then be used to generate a cruising recommendation.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 3a shows an exemplary table of a vehicle data record;

FIG. 3b shows an example of a set of vehicle data records transmitted by a particular taxi over a period of time;

FIG. 6 shows an exemplary table representing a data record of a matched road segment returned by the search or query;

FIG. 7 shows an exemplary transition table that stores the transition information;

FIG. 9b shows an exemplary transition pair table;

FIG. 9c shows an exemplary transition probability table; and

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for vehicle position planning is described herein. One aspect of the present framework generates dynamic cruising recommendations for vehicle (e.g., taxi) drivers by connecting demand and supply in a loosely coupled way. Demand patterns with temporal and spatial characteristics may be derived from historical records, while supply patterns may be discovered using a self-learning transition model based on real-time vehicle data. Supply and demand may then be matched to achieve overall optimization and, efficiency and effectiveness can be ensured. The framework advantageously provides a systematic and automatic solution to help vehicle drivers quickly find the next passenger, and thereby significantly cut down empty running time, energy consumption and resulting pollution and waste.

It should be appreciated that the framework described herein may be in the context of taxis for purposes of illustration. However, the framework may also apply to any other forms of vehicles for hire used by one or more passengers for transportation. It should also be appreciated that the framework described herein may be implemented as a method, a computer-controlled apparatus, a computer process, a computing system, or as an article of manufacture such as a computer-usable medium. These and various other features and advantages will be apparent from the following description.

Figure 1:
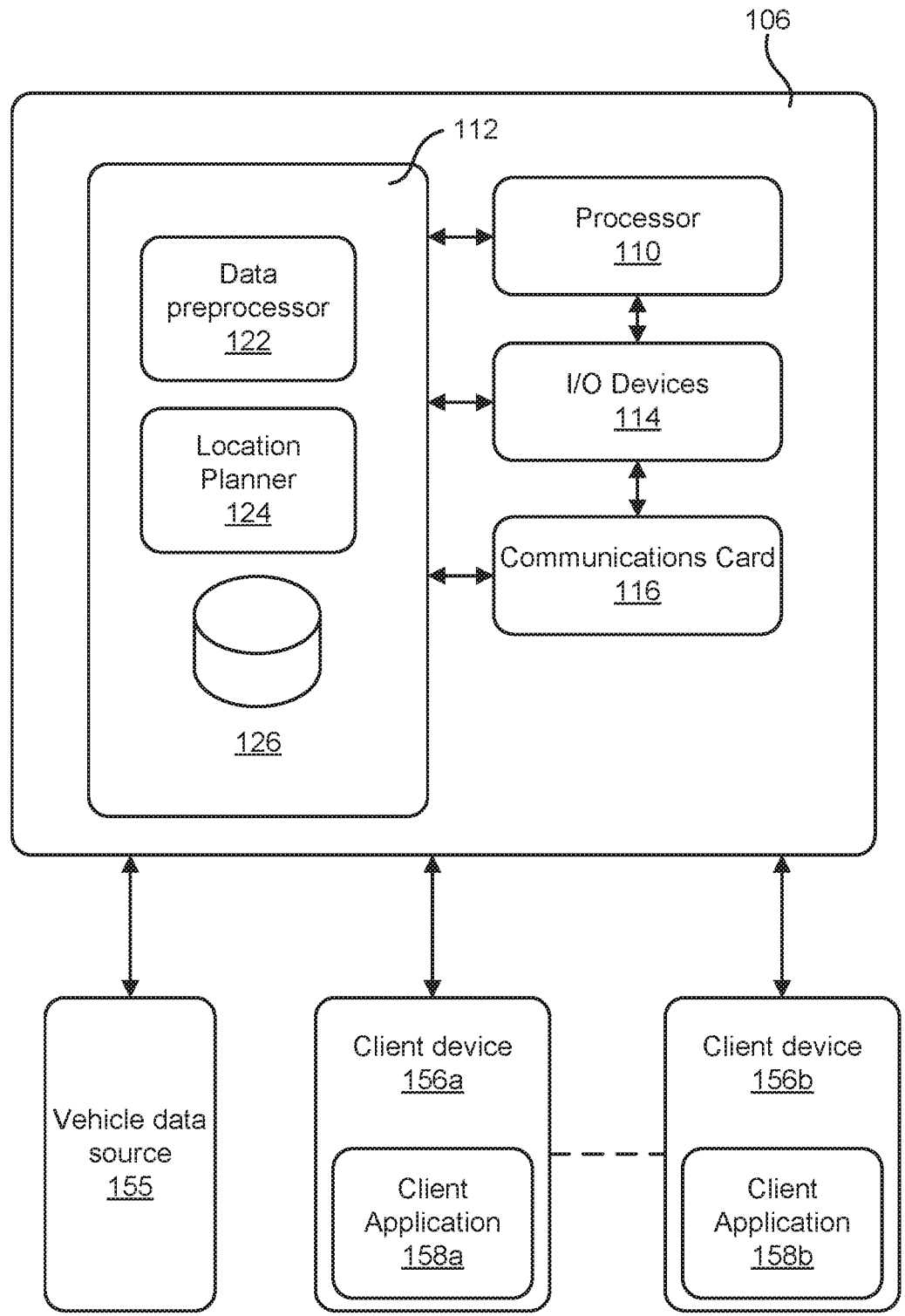
FIG. 1 is a block diagram illustrating an exemplary architecture.

FIG. 1 is a block diagram illustrating an exemplary architecture 100 in accordance with one aspect of the present framework. Generally, exemplary architecture 100 includes a server 106, a vehicle data source 155 and one or more client devices 156a-b. Server 106 includes a processor device 110, input/output devices 114 (e.g., keyboard, touchpad, microphone, camera, display device, monitor, printer, speaker, etc.), a communications card or device 116 (e.g., a modem and/or a network adapter) for exchanging data with a network (e.g., local area network, wide area network) and memory module 112. The server 106 may be operated in a networked environment using logical connections to vehicle data source 155 and one or more client devices 156a-b. Client devices 156a-b may include components similar to the server 106, and may be in the form of a desktop computer, mobile device, tablet computer, communication device, browser-based device, etc.

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memories, or a combination thereof.

Memory module 112 serves to store machine-executable instructions, data, and various software components for implementing the techniques described herein, all of which may be processed by processor device 110. As such, server 106 is a general-purpose computer system that becomes a specific-purpose computer system when executing the machine-executable instructions. Alternatively, the various techniques described herein may be implemented as part of a software product, which is executed via server 106. Each computer program may be implemented in a high-level procedural or object-oriented programming language (e.g., C, C++, Java, Advanced Business Application Programming (ABAP™) from SAP® AG, Structured Query Language (SQL), etc.), or in assembly of machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, the memory module 112 includes a data preprocessor 122, a location planner 124 and a database 126. Data preprocessor 122 and location planner 124 may include a set of function modules, procedures or programs designed to perform various data collection and/or processing functions. Database 126 may include a database management system (DBMS) code using a database query language, such as SQL or extensions thereof. Other types of programming languages are also useful. The DBMS may include a set of programs, functions or procedures (e.g., HANA custom procedures) for defining, administering and processing the database 126.

In some implementations, database 126 is an in-memory database that relies primarily on the system's main memory for efficient computer data storage. More particularly, the data in the in-memory database may reside in volatile memory and not persistently store on a hard drive, thereby allowing the data to be instantly accessed and scanned at a speed of several megabytes per millisecond. The in-memory database 126 allows seamless access to and propagation of high volumes of data in real-time. Parallel processing may further be achieved by using a multicore processor 110 in conjunction with the in-memory database 126. In-memory database technology includes systems such as SAP's HANA (high performance analytic appliance) in-memory computing engine.

Vehicle data source 155 provides vehicle data (e.g., vehicle location, passenger state) for processing by server 106. Vehicle data source 155 may be a database or a set of one or more data streaming devices installed or located in vehicles (e.g., taxis). In some implementations, vehicle data source 155 is a global positioning system (GPS) navigation device capable of streaming vehicle data to server 106 in real-time or periodically. A user at the client device 156a-b may interact with a client application 158a-b to communicate with the server 106 to receive, for example, cruising recommendations. The user may be, for example, a taxi operator who controls the distribution of taxis in response to service requests or a taxi driver looking to pick up one or more passengers.

It should be appreciated that the different components and sub-components of the server 106 may be located on different machines or systems. For example, data preprocessor 122 and location planner 124 may be implemented on different physical machines or computer systems. It should further be appreciated that the different components of vehicle data source 155 and client device 156a-b may also be located on the server 106, or vice versa.

Figure 2:
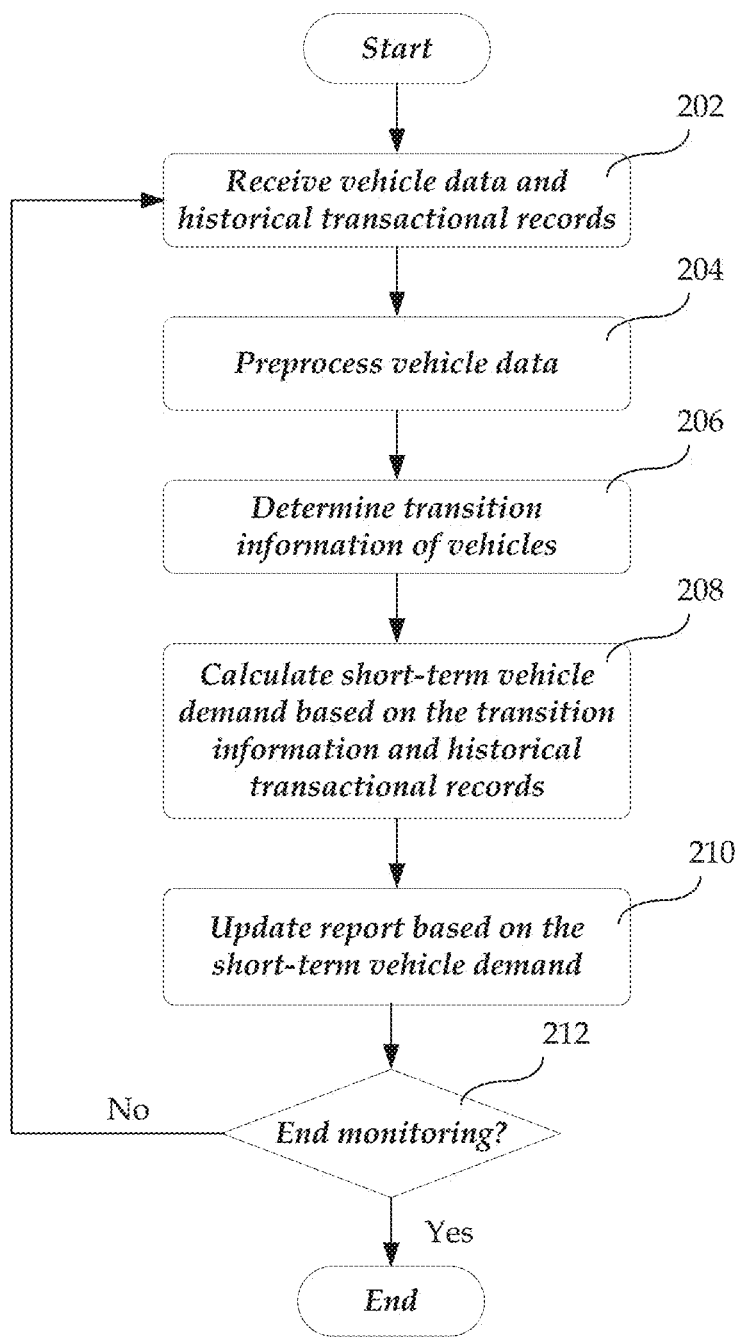
FIG. 2 shows an exemplary method of determining short-term vehicle demand.

FIG. 2 shows an exemplary method 200 of determining short-term vehicle demand. The method 200 may be performed automatically or semi-automatically by the system 100, as previously described with reference to FIG. 1. It should be noted that in the following discussion, reference will be made, using like numerals, to the features described in FIG. 1.

At 202, data preprocessor 122 retrieves vehicle data and retrieves historical transactional records. The vehicle data and historical transactional records may be directly or indirectly received from vehicle data source 155. As discussed previously, vehicle data source 155 may include a GPS device capable of constantly streaming vehicle and transactional data in substantially real-time to server 106. The vehicle data may include information about the vehicle's identification (e.g., device identifier, license plate number, driver name), vehicle location (e.g., latitude and longitude), time of capture (i.e., when information was captured), heading direction (e.g., angle between direction and a cardinal direction such as North), passenger state (e.g., empty or occupied), and/or other information. The transactional data describe transactions that previously occurred in the vehicles, including time points and locations at which a passenger boarded and alighted from a given vehicle.

FIG. 3a shows an exemplary table of a vehicle data record 302. As shown, the columns of the data record 302 store values representing the name, type and comments describing each variable. The variables include device identifier (DEVID), latitude (LAT), longitude (LNG), time of capture (GPS_TIME), heading direction (HEADING) and passenger state (PASSENGER_STATE). FIG. 3b shows an example of a set of vehicle data records 310 transmitted by a particular taxi over a period of time.

Returning to FIG. 2, at 204, data preprocessor 122 preprocesses the vehicle data. During data-preprocessing, dirty data is filtered and cleaned, and then inserted back into the dataset. In some implementations, the preprocessed data is inserted back into a track table that has the same or similar structure as the vehicle data record.

At 206, location planner 124 determines the transition information of vehicles based on the preprocessed vehicle data. The transition information describes locations and passenger states (e.g., empty or not empty) of a starting road segment ("$Seg_{from}$") along which a given vehicle is currently traveling and an ending road segment ("$Seg_{to}$") along which the vehicle will be traveling in the next time slot. A time slot is a predefined time interval. For example, a time slot may be defined as a 1-minute time interval between 12:00 pm and 12:01 pm. In this example, the previous time slot is the time interval (e.g., 11:59 pm to 12:00 pm) occurring earlier than the current time slot, while the next time slot is the time interval (e.g., 12:01 pm to 12:02 pm) occurring subsequent to the current time slot. Shorter or longer time intervals may also be used.

Figure 4:
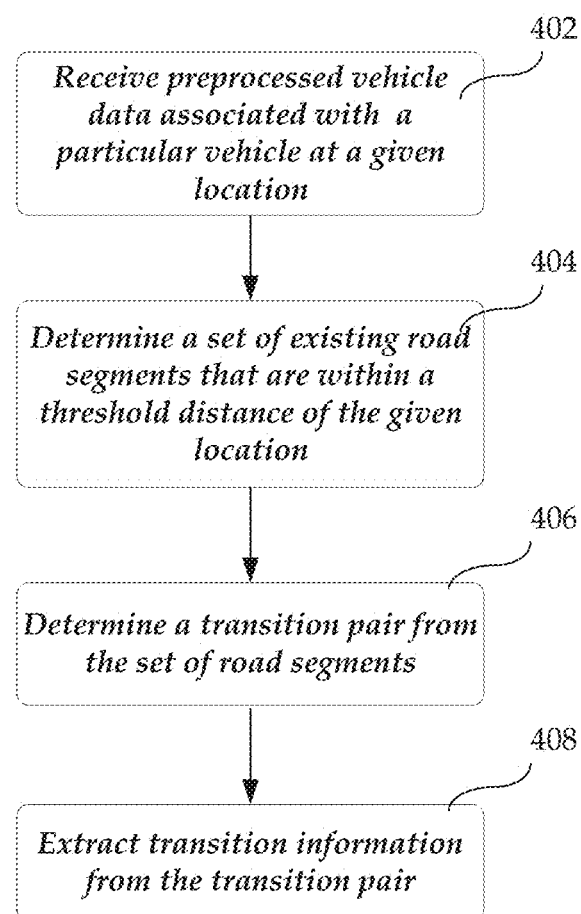
FIG. 4 shows an exemplary method of determining transition information associated with a particular vehicle.

FIG. 4 shows an exemplary method 206 of determining transition information associated with a particular vehicle. The method 206 may be repeated to generate transition information for different vehicles.

At 402, location planner 124 receives the preprocessed vehicle data associated with a particular vehicle at a current location during a current time slot.

At 404, location planner 124 determines a set of existing road segments that are within a threshold distance ($D_{threshold}$) of the current location. This may be performed by, for example, invoking an SQL query statement to search for road segments to find matching road segments located at a distance that is less than $D_{threshold}$ from the current location. A "road segment" is a predefined data record that stores geometric vector information of a portion of a road network. Such road segments may be stored in database 126.

Figure 5:
FIG. 5 shows an exemplary road segment table that represents a particular road segment.

FIG. 5 shows an exemplary road segment table 500 that represents a particular road segment. The table stores information about the road segment, such as a unique identifier, latitude and longitude of the starting (or "from") point, and latitude and longitude of the ending (or "to") point of the road segment.

FIG. 6 shows an exemplary table 600 representing a data record of a matched road segment returned by the search or query. As shown, the table 600 stores identification information (DEVID) of the vehicle, the time (GPS_TIME) at which the vehicle data was captured, the passenger state (PASSENGER_STATE) which indicates whether the vehicle is empty or occupied by a passenger, and a foreign key or pointer (TO_SEGMENT_ID) to the corresponding road segment table.

Returning to FIG. 4, at 406, location planner 124 determines a transition pair ($Seg_{from}$, $Seg_{to}$) from a set of road segments. The starting road segment ($Seg_{from}$) may be determined by finding the road segment that is closest (or with the minimal distance) to the current location. The ending road segment ($Seg_{to}$) may be determined by finding the last matched segment for this vehicle.

At 408, location planner 124 extracts or compiles transition information from data records of the transition pair. In some implementations, location planner 124 stores the transition information in a transition table. FIG. 7 shows an exemplary transition table 700 that stores the transition information. As shown, the transition information may include identification information (DEVID) of the vehicle, time (FROM_GPS_TIME) at which the vehicle data was captured at the starting road segment $Seg_{from}$, passenger state (FROM_PASSENGER_STATE) which indicates whether the vehicle was empty or occupied by a passenger at the starting road segment $Seg_{from}$, foreign key or pointer (FROM_SEGMENT_ID) to the corresponding starting road segment $Seg_{from}$ table, time (TO_GPS_TIME) at which the vehicle data was captured at the ending road segment $Seg_{to}$, passenger state (TO_PASSENGER_STATE) which indicates whether the vehicle was empty or occupied at the ending road segment $Seg_{to}$, and foreign key or pointer (TO_SEGMENT_ID) to the corresponding ending road segment $Seg_{to}$ table.

Returning to FIG. 2, at 208, location planner 124 calculates the short-term demand for vehicles based on the transition information and historical transaction records. The short-term vehicle demand for each road segment may be predicted by subtracting the number of empty vehicles (i.e., vehicles with no passengers) from the number of vehicles that had new passengers boarding (or getting) for the next time slot. The number of vehicles that had new passengers boarding (or getting) may be estimated based on historical transactional records of passengers boarding a vehicle at the next time slot during the last few days, while the number of empty vehicles may be predicted for the next time slot by using the transition information.

Figure 8:
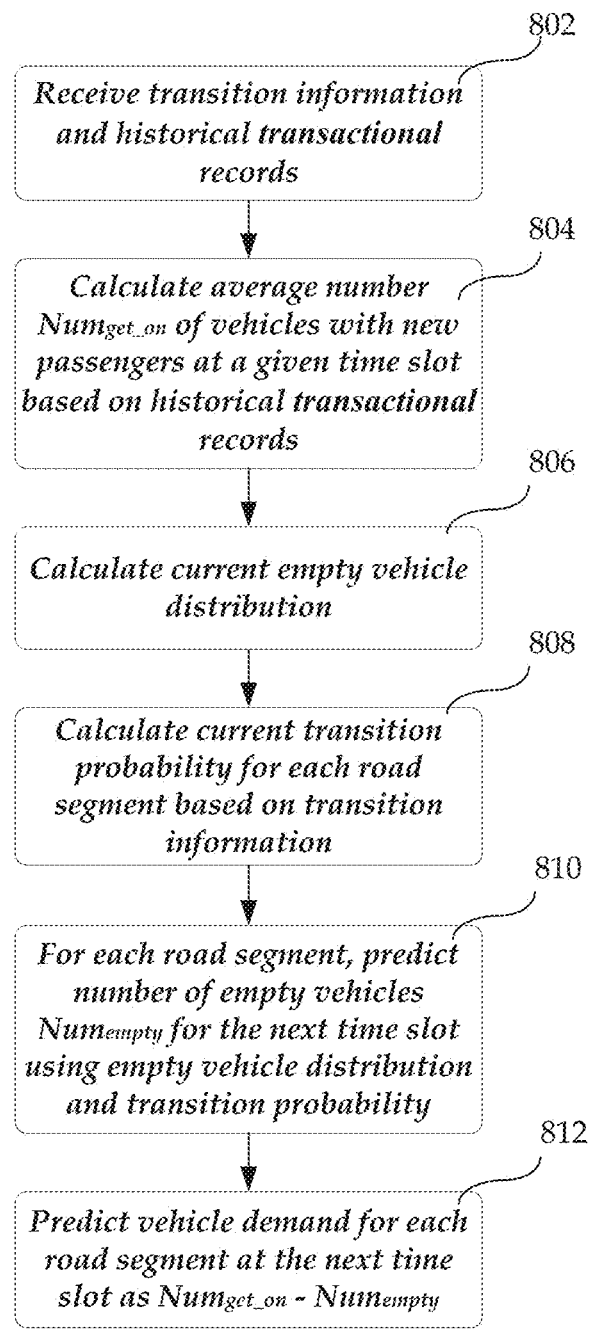
FIG. 8 shows an exemplary method for predicting the short-term vehicle demand for various road segments.

FIG. 8 shows an exemplary method 208 for predicting the short-term vehicle demand for various road segments.

At 802, location planner 124 receives transition information and historical transactional records. The transition information and historical transactional records may be retrieved from the database 126. As described previously, each record in the transition information describes pair of starting road segment ("$Seg_{from}$" or "From Segment") along which a given vehicle is currently traveling, and ending road segment ("$Seg_{to}$" or "To Segment") along which the vehicle will be traveling in the next time slot.

Figure 9A:
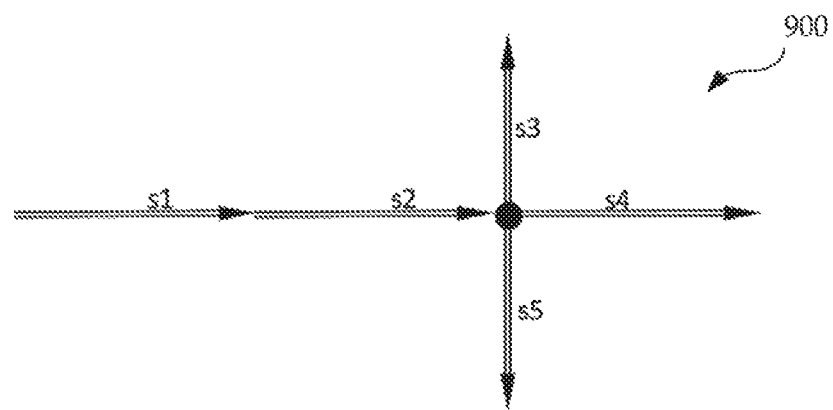
FIG. 9a shows an exemplary city road network.

FIG. 9*a* shows an exemplary city road network 900. The city road network 900 includes interconnected predefined road segments s1, s2, s3, s4 and s5. Each predefined road segment (s1, s2, s3, s4, s5) may be represented by a directional geometric vector. FIG. 9*b* shows an exemplary transition pair table 910 corresponding to the city road network 900. The table 910 stores the transition pairs for different vehicles during a specific time slot t1. The different vehicles are identified by the "plate numbers" v0 to v5.

Returning to FIG. 8, at 804, location planner 124 calculates the average number $Num_{get\_on}$ of vehicles that had new passengers boarding (or getting) at each road segment during the next time slot based on the historical transactional records. In some implementations, the average number $Num_{get\_on}$ may be calculated by determining, from the historical transactional records, the total number of vehicles with new passengers getting on at each road segment during the next time slot in previous N days, and dividing the total number by N.

At 806, location planner 124 calculates the current empty vehicle distribution based on the transition information. The current empty vehicle distribution indicates the number of vehicles traveling along each road segment during the current time slot without any passengers. The current empty vehicle distribution may be calculated by searching the transition information for vehicles that are empty (e.g., FROM_PASSENGER_STATE=0) and extracting the starting segment information (e.g., FROM_SEGMENT_ID).

At 808, location planner 124 calculates the current transition probability based on the transition information. The current transition probability indicates the likelihood that the vehicle traveling from the current road segment will travel to another given road segment in the next time slot.

The transitional probability ($Tr_{AB}$) that a vehicle traveling along road segment A will travel to road segment B may be calculated by determining the following:

$$Tr_{AB} = \frac{\text{Number of vehicles that traveled from } A \text{ to } B}{\text{Total number of vehicles that traveled from } A} \times 100\% \quad (1)$$

For example, referring to table 910 in FIG. 9*b*, vehicle v0 traveled from segment s1 to segment s2 during time slot t1. 5 vehicles (v1-v5) traveled from s2 to road segments, s3, s4 or s5. FIG. 9*c* shows an exemplary transition probability table 920 containing transition probabilities of vehicles traveling from segment s2 to respective segments s3, s4 or s5 at time slot t1. For example, referring to table 910, 1 out of 5 vehicles traveled from segment s2 to segment s3. Accordingly, the transition probability from segment s2 to segment s3 is 20%.

Returning to FIG. 8, at 810, location planner 124 predicts the number of empty vehicles $Num_{empty}$ for the next time slot based on the transition probabilities and current empty vehicle distribution. For example, referring to FIG. 9*c*, the transition probability of segment s2 (e.g., $Tr_{s2s4}$ 60%) at time slot t1 may be used to predict vehicle v0's transition route for the next time slot t2. More particularly, based on the current empty vehicle distribution, location planner 124 may determine that 10 empty vehicles are traveling along segment s2 at time slot t1. Using the transition probability of vehicles travelling from segments s2 to segment s4 (e.g., $Tr_{s2s4}$=60%), location planner 124 may predict that 6 empty vehicles will travel from segment s2 to segment s4 at time slot t2 (i.e., $Num_{empty}$=10×60%=6).

At 812, location planner 124 predicts the vehicle demand for the next time slot. The vehicle demand may be defined as the net demand for vehicles for each road segment for the next time slot. In some implementations, the vehicle demand is determined by subtracting the number of empty vehicles $Num_{empty}$ from the number $Num_{get\_on}$ of vehicles with new passengers.

Returning to FIG. 2, at 210, location planner 124 updates a report based on the short-term demand for the vehicles. In some implementations, the report is presented in a form of a graphical map. The report may also be presented in the form of recommendations for cruising locations, which can be derived from the short-term demand and will be described in more detail later. Other forms of presentation are also useful.

Figure 10:
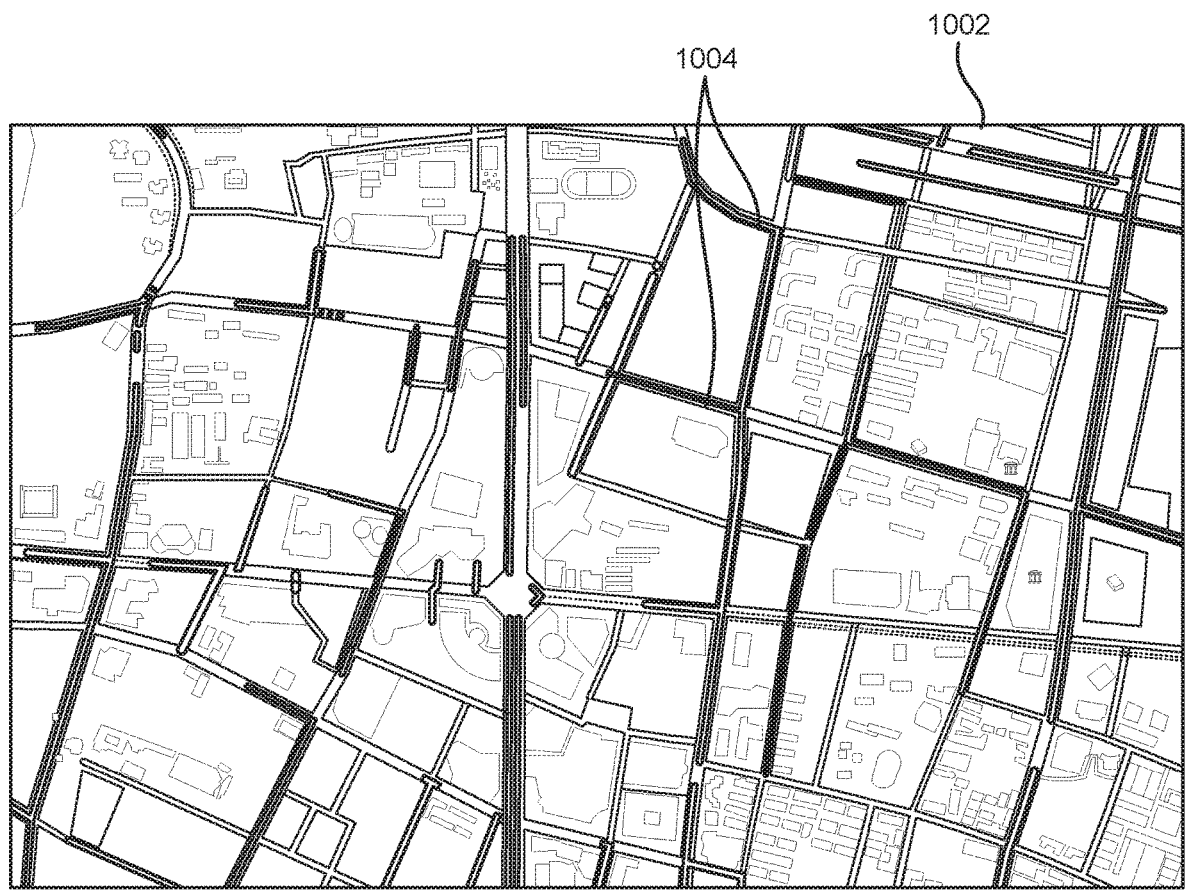
FIG. 10 shows an exemplary city map.

FIG. 10 shows an exemplary city map 1002 that may be updated by the location planner 124. The map 1002 highlights hot spots 1004 with highest short term demand and lowest supply during a certain time slot. Such hot spots 1004 serve as "seeds" for generating cruising recommendations for nearby taxis to guide them to places where travel demand has not been fulfilled yet.

At 212, location planner 124 determines if monitoring should end. If yes, the process 200 ends. If no, the process 200 continues at 202 to constantly and repetitively process additional vehicle data and historical transactional records. Additional vehicle data and historical transactional records may be constantly processed at frequent time slots by repeating steps 202 through 210.

Demand patterns may be mined at regular time intervals (e.g., weekly) from the demand information generated by process 200. Location planner 124 may further generate dynamic cruising recommendations for individual vehicles based on the demand information. For example, location planner 124 may recommend a "best-to-be" position for a vehicle. The best-to-be" position may be a nearby road segment with the highest short-term demand that is within a pre-defined distance of the vehicle. Location planner 124 may activate a client application 158a-b to cause a cruising recommendation to display on a client device 156a-b. The cruising recommendation may be a push notification that alerts the vehicle driver to head towards the best-to-be position or other recommended road segments. The cruising recommendation may include, for example, one or more recommended road segments (e.g., target road segment identifiers, associated ratings).

In some implementations, a controller (or distributor) at an operation center uses one of the client devices 156a-b to request and receive cruising recommendations for individual vehicles via client application 158a-b based on their real-time locations and moving directions. The controller may use the client application 158a-b to add or adjust vehicle demands for specific road segments, so as to tune recommendation calculations to event-driven travel demand changes. For example, if a baseball match or other major event has just finished at the city center, a boost in demand may be expected since the spectators will need a taxi to get home. The controller may provide such event-driven demand information via the client application 158a-b to the location planner 124 to adjust the cruising recommendations.

In other implementations, vehicle drivers who are searching for their next passengers may use, for example, onboard client devices 156a-b to request and receive cruising recommendations in a timely manner via client applications 158a-b. Individual vehicle drivers may receive specific cruising recommendations periodically (e.g., every 1 minute) or as needed (e.g., when approaching a street crossing). The vehicle drivers may instantly receive new recommendations if they did not follow previous recommendation (i.e., head another direction). The recommendations may be optimized on a systematical level according to the vehicles' real-time movement, passenger status changes (e.g., a passenger may board the taxi while it is cruising on the road) and demand patterns learnt from historical data, to ensure adequate but not too many vehicles are cruising to the demand hotspots.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

What is claimed is:

1. A method of vehicle position planning, comprising:
receiving vehicle data and historical transactional records derived, at least in part, from a plurality of streaming devices installed or located in each of a plurality of vehicles;
determining transition information based on the vehicle data, wherein the transition information includes pairs of starting and ending road segments and corresponding passenger states;
predicting short-term demand for vehicles based on the transition information and the historical transactional records by:
calculating a number of empty vehicles for the given road segment in the next time slot by (i) calculating a current empty vehicle distribution based on the transition information, (ii) calculating one or more current transition probabilities based on the transition information; and (iii) predicting the number of empty vehicles in the next time slot based on the current empty vehicle distribution and the one or more current transition probabilities; and
calculating a number of empty vehicles for the given road segment in the next time slot and
subtracting the number of empty vehicles from the number of vehicles with new passengers; and
generating a cruising recommendation based on the short-term demand.

2. The method of claim 1 wherein determining the transition information comprises:
determining, by invoking a SQL query statement, a set of predefined road segments within a threshold distance of a current location, each road segment being a predefined data record storing geometric vector information of a portion of a road network;
determining a transition pair of the starting and ending road segments from the set of predefined road segments; and
extracting the transition information from data records of the transition pair.

3. The method of claim 2 wherein each of the predefined road segments stores a unique identifier, a starting point and an ending point.

4. The method of claim 1 wherein calculating the number of vehicles with new passengers boarding at the given road segment comprises determining, from the historical transactional records, a total number of vehicles with new passengers getting on at the given road segment during the next time slot in previous N days, and dividing the total number by N.

5. The method of claim 1 wherein calculating the one or more current transition probabilities comprises determining a ratio of a number of vehicles that traveled from first to second road segments to a total number of vehicles that traveled from the first road segment.

6. The method of claim 1 further comprises updating a map that highlights hot spots with highest short-term demand.

7. The method of claim 1 wherein generating the cruising recommendation comprises determining a best-to-be position with a highest short-term demand and is within a pre-defined distance of a vehicle.

8. The method of claim 1 further comprises activating a client application to cause the cruising recommendation to display on a client device.

9. The method of claim 1 further comprises adjusting the cruising recommendation based on event-driven demand information.

10. The method of claim 1 further comprises transmitting the cruising recommendation to a client device periodically or as needed.

11. The method of claim 1, wherein the vehicle data is streamed by each streaming device to a remote server.

12. The method of claim 1, wherein the vehicle data comprises at least one of: vehicle identification, vehicle location, time of capture, heading direction, or passenger state.

13. One or more non-transitory computer-readable media having stored thereon program code, the program code executable by a computer to perform steps comprising:
receiving vehicle data and historical transactional records derived, at least in part, from a plurality of streaming devices installed or located in each of a plurality of vehicles;
determining transition information based on the vehicle data, wherein the transition information includes pairs of starting and ending road segments and corresponding passenger states;
predicting short-term demand for vehicles based on the transition information and the historical transactional records by:
calculating a number of empty vehicles for the given road segment in the next time slot by (i) calculating a current empty vehicle distribution based on the transition information, (ii) calculating one or more current transition probabilities based on the transition information; and (iii) predicting the number of empty vehicles in the next time slot based on the current empty vehicle distribution and the one or more current transition probabilities; and
calculating a number of empty vehicles for the given road segment in the next time slot and
subtracting the number of empty vehicles from the number of vehicles with new passengers; and
generating a cruising recommendation based on the short-term demand.

14. The one or more non-transitory computer-readable media of claim 13 wherein determining the transition information comprises:
determining a set of predefined road segments within a threshold distance of a current location;
determining a transition pair of the starting and ending road segments from the set of predefined road segments; and
extracting the transition information from data records of the transition pair.

15. A system for vehicle position planning comprising:
at least one computer processor; and
memory storing instructions which, when executed by the at least one computer processor, result in operations comprising:
receiving vehicle data and historical transactional records derived, at least in part, from a plurality of streaming devices installed or located in each of a plurality of vehicles;
determining transition information based on the vehicle data, wherein the transition information includes pairs of starting and ending road segments and corresponding passenger states;
predicting short-term demand for vehicles based on the transition information and the historical transactional records by:
calculating a number of empty vehicles for the given road segment in the next time slot by (i) calculating a current empty vehicle distribution based on the transition information, (ii) calculating one or more current transition probabilities based on the transition information; and (iii) predicting the number of empty vehicles in the next time slot based on the current empty vehicle distribution and the one or more current transition probabilities; and
calculating a number of empty vehicles for the given road segment in the next time slot; and
subtracting the number of empty vehicles from the number of vehicles with new passengers; and
generating a cruising recommendation based on the short-term demand.

16. The system of claim 15 wherein determining the transition information comprises:
determining, by invoking a SQL query statement, a set of predefined road segments within a threshold distance of a current location, each road segment being a predefined data record storing geometric vector information of a portion of a road network;
determining a transition pair of the starting and ending road segments from the set of predefined road segments; and
extracting the transition information from data records of the transition pair.

17. The system of claim 16 wherein each of the predefined road segments stores a unique identifier, a starting point and an ending point.

18. The system of claim 17 wherein:
calculating the number of vehicles with new passengers boarding at the given road segment comprises determining, from the historical transactional records, a total number of vehicles with new passengers getting on at the given road segment during the next time slot in previous N days, and dividing the total number by N; and
calculating the one or more current transition probabilities comprises determining a ratio of a number of vehicles that traveled from first to second road segments to a total number of vehicles that traveled from the first road segment.

19. The system of claim 15, wherein generating the cruising recommendation comprises determining a best-to-be position with a highest short-term demand and is within a pre-defined distance of a vehicle.

20. The system of claim 19, wherein the vehicle data is streamed by each streaming device to a remote server, and the vehicle data comprises at least one of:

vehicle identification, vehicle location, time of capture, heading direction, or passenger state.

* * * * *